US011812158B2

(12) United States Patent
Kawamoto et al.

(10) Patent No.: US 11,812,158 B2
(45) Date of Patent: Nov. 7, 2023

(54) IMAGE CAPTURE DEVICE HAVING CONTROL TO INSERT OR REMOVE FILTER, CONTROL METHOD, AND STORAGE MEDIUM

(71) Applicant: CANON KABUSHIKI KAISHA, Tokyo (JP)

(72) Inventors: Tomohiro Kawamoto, Tokyo (JP); Takao Saito, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/543,552

(22) Filed: Dec. 6, 2021

(65) Prior Publication Data
US 2022/0191378 A1    Jun. 16, 2022

(30) Foreign Application Priority Data

Dec. 15, 2020    (JP) ................................ 2020-207883

(51) Int. Cl.
*H04N 23/73*    (2023.01)
(52) U.S. Cl.
CPC ................................. *H04N 23/73* (2023.01)
(58) Field of Classification Search
CPC .................................................... H04N 5/2353
See application file for complete search history.

(56) References Cited

U.S. PATENT DOCUMENTS

| 6,195,511 | B1 * | 2/2001 | Harada | G03B 17/00 |
| | | | | 396/300 |
| 2006/0244583 | A1 * | 11/2006 | Kawada | H04N 5/232945 |
| | | | | 348/E5.04 |
| 2007/0195174 | A1 * | 8/2007 | Oren | H04N 5/23216 |
| | | | | 348/222.1 |
| 2008/0187187 | A1 * | 8/2008 | Tezuka | G06V 40/161 |
| | | | | 382/118 |

(Continued)

FOREIGN PATENT DOCUMENTS

| JP | 2011041216 A | * | 2/2011 |
| JP | 6525723 B2 | | 6/2019 |
| WO | 2017018188 A1 | | 2/2017 |

OTHER PUBLICATIONS

Machine Translation of JP-2011041216-A (Year: 2011).*

*Primary Examiner* — Jason A Flohre
(74) *Attorney, Agent, or Firm* — CANON U.S.A., INC. IP Division (57) ABSTRACT

An image capture device includes an image capture circuit, a control unit, a determination unit, and a filter control unit. The image capture circuit is configured to capture an image formed by an image capture optical system. The control unit is configured to control exposure by determining an exposure time of each of pixel groups including one or more pixels on an image capture surface of the image capture circuit. The determination unit is configured to, on a basis of the exposure time, determine whether an image capture mode is to be a first mode in which a filter configured to attenuate infrared rays is inserted in an optical path of the (Continued)

image capture optical system or a second mode in which the filter is removed from the optical path. The filter control unit is configured to control insertion and removal of the filter.

14 Claims, 12 Drawing Sheets

(56) References Cited

U.S. PATENT DOCUMENTS

| | | | | |
|---|---|---|---|---|
| 2016/0094797 | A1* | 3/2016 | Yoon | H04N 5/35554 |
| | | | | 348/294 |
| 2017/0078591 | A1* | 3/2017 | Petrov | H04N 5/04 |
| 2018/0227514 | A1* | 8/2018 | Takahashi | H04N 5/2353 |

* cited by examiner

| AREA | EXPOSURE TIME | BRIGHTNESS |
|---|---|---|
| A1 | 1/100 | 155 |
| A2 | 1/50 | 150 |
| A3 | 1/30 | 140 |

| AREA | EXPOSURE TIME | BRIGHTNESS |
|---|---|---|
| B1 | 1/100 | 155 |
| B2 | 1/100 | 155 |
| B3 | 1/50 | 150 |

| AREA | EXPOSURE TIME | BRIGHTNESS |
|---|---|---|
| C1 | 1/300 | 160 |
| C2 | 1/300 | 160 |
| C3 | 1/100 | 155 |

| AREA | EXPOSURE TIME | BRIGHTNESS |
|---|---|---|
| D1 | 1/500 | 165 |
| D2 | 1/300 | 160 |
| D3 | 1/100 | 155 |

FIG.3C

| PARAMETER | REFERENCE VALUE |
|---|---|
| EXPOSURE TIME | 1/40 |

| AREA | EXPOSURE TIME | BRIGHTNESS |
|------|---------------|------------|
| A1   | 1/300         | 155        |
| A2   | 1/100         | 150        |
| A3   | 1/60          | 140        |

| AREA | EXPOSURE TIME | BRIGHTNESS |
|------|---------------|------------|
| B1   | 1/300         | 155        |
| B2   | 1/300         | 155        |
| B3   | 1/100         | 150        |

| AREA | EXPOSURE TIME | BRIGHTNESS |
|------|---------------|------------|
| C1   | 1/500         | 160        |
| C2   | 1/500         | 160        |
| C3   | 1/300         | 155        |

| AREA | EXPOSURE TIME | BRIGHTNESS |
|------|---------------|------------|
| D1   | 1/1000        | 165        |
| D2   | 1/500         | 160        |
| D3   | 1/300         | 155        |

| AREA | EXPOSURE TIME | BRIGHTNESS | AREA | EXPOSURE TIME | BRIGHTNESS | AREA | EXPOSURE TIME | BRIGHTNESS | AREA | EXPOSURE TIME | BRIGHTNESS |
|---|---|---|---|---|---|---|---|---|---|---|---|
| A1 | 1/200 | 140 | B1 | 1/500 | 160 | C1 | 1/500 | 160 | D1 | 1/500 | 150 |
| A2 | 1/500 | 145 | B2 | 1/500 | 160 | C2 | 1/500 | 166 | D2 | 1/500 | 160 |
| A3 | 1/30 | 150 | B3 | 1/500 | 165 | C3 | 1/200 | 165 | D3 | 1/200 | 150 |

FIG.6C

| PARAMETER | REFERENCE VALUE |
|---|---|
| EXPOSURE TIME | 1/550 |

FIG.7

IMAGE CAPTURE DEVICE HAVING CONTROL TO INSERT OR REMOVE FILTER, CONTROL METHOD, AND STORAGE MEDIUM

BACKGROUND

Technical Field

One disclosed aspect of the embodiments relates to an image capture device, a control method, and a storage medium.

Description of the Related Art

WO2017/018188 discusses a technique of enlarging a dynamic range by dividing an image into a plurality of areas, and controlling an exposure time of each of the divided areas or each pixel.

On the other hand, Japanese Patent No. 6525723 discusses a technique of capturing an image most appropriate for a time period or an object by dividing an image into a plurality of areas, calculating an average value of brightness of each of the divided areas, and removing an infrared cut-off filter if the average value of brightness is smaller than a predetermined reference value.

In general, a mode in which an image is captured with the infrared cut-off filter inserted is referred to as a day mode, and a mode in which an image is captured with the infrared cut-off filter removed is referred to as a night mode.

SUMMARY

An image capture device includes an image capture circuit, a control unit, a determination unit, and a filter control unit. The image capture circuit is configured to capture an image formed by an image capture optical system. The control unit is configured to control exposure by determining an exposure time of each of pixel groups including one or more pixels on an image capture surface of the image capture circuit. The determination unit is configured to, on a basis of the exposure time determined by the control unit, determine whether an image capture mode is to be a first mode in which a filter configured to attenuate infrared rays is inserted in an optical path of the image capture optical system or a second mode in which the filter is removed from the optical path of the image capture optical system. The filter control unit is configured to control insertion and removal of the filter depending on the image capture mode determined by the determination unit.

Further features of the disclosure will become apparent from the following description of exemplary embodiments with reference to the attached drawings.

DESCRIPTION OF THE EMBODIMENTS

A first exemplary embodiment will be described in detail. Exemplary embodiments described below are examples for realizing the disclosure, and should be appropriately modified or changed on the basis of a configuration of a device to which the disclosure is applied or various conditions, and the disclosure is not limited to the following exemplary embodiments. Parts of each of the exemplary embodiments described below may be appropriately combined to configure an exemplary embodiment.

(Device Configuration)

Figure 1:
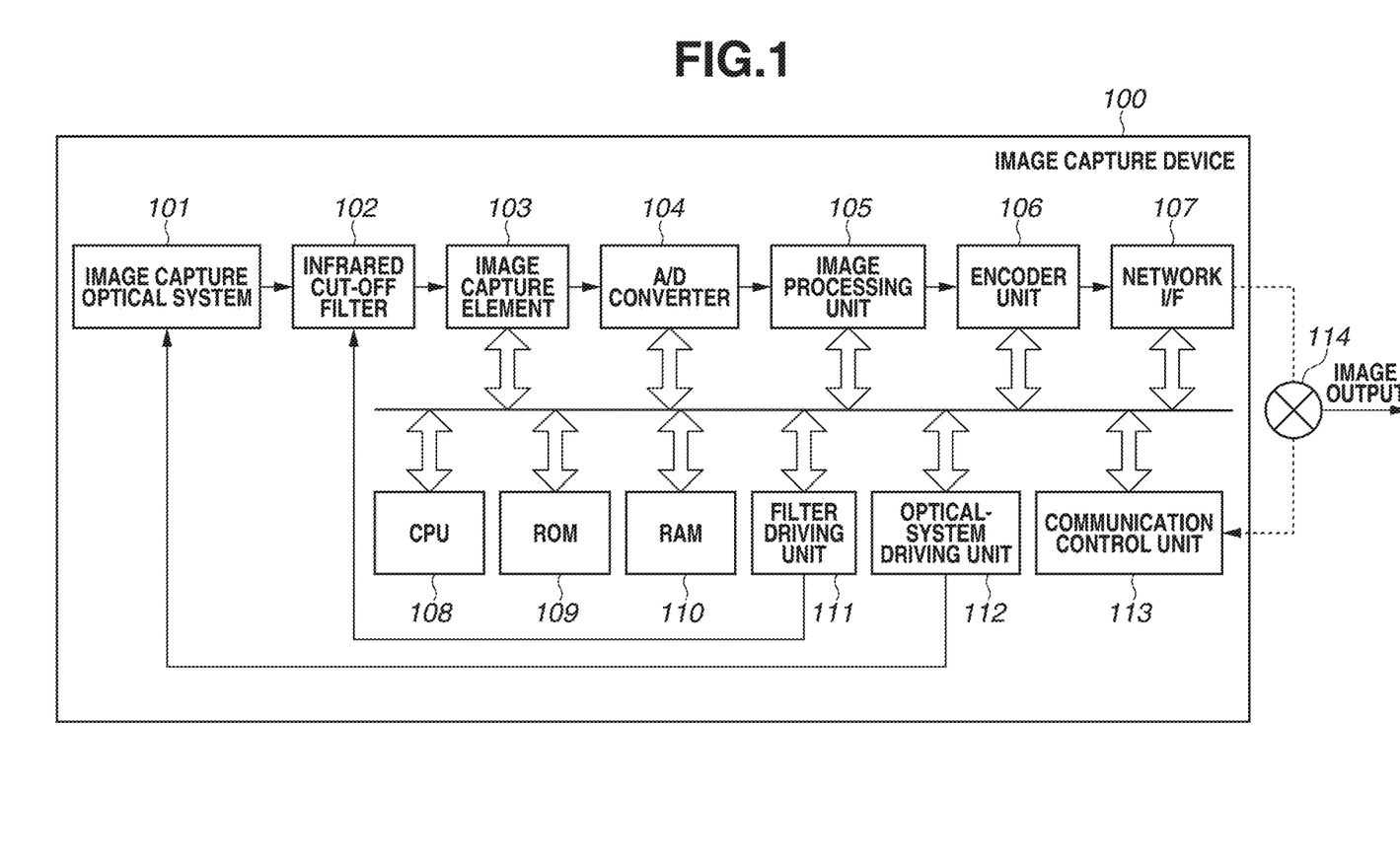
FIG. 1 is a schematic view illustrating a device configuration of an image capture device according to a first exemplary embodiment.

FIG. 1 is a block diagram illustrating a configuration of an image capture device 100 according to the first exemplary embodiment. The image capture device 100 illustrated in FIG. 1 includes an image capture optical system 101, an infrared cut-off filter 102, an image capture element 103, an analog-to-digital (A/D) converter 104, an image processing unit 105, an encoder unit 106, and a network interface (I/F) 107. The image capture device 100 includes a central processing unit (CPU) or programmable processor 108, read-only memory (ROM) 109, random-access memory (RAM) 110, a filter driving unit 111, an optical-system driving unit 112, and a communication control unit 113. The memories 110 or 109 may contain instructions or program that, when executed by the CPU 108, cause the CPU 108 to perform as various functional units.

The image capture optical system 101 is a group of optical members including a zoom lens, a focus lens, a shake compensation lens, an aperture, and a shutter, and forming an image of an object.

The infrared cut-off filter 102 is provided in an optical path between the image capture optical system 101 and the image capture element 103. The infrared cut-off filter 102 is driven by the filter driving unit 111 described below to be inserted into or removed from the optical path. The infrared cut-off filter 102 is a filter having a transmittance of visible light (for example, wavelengths from 380 to 780 nanometer) larger than a transmittance of infrared rays (for example, wavelengths of 780 nanometer or longer), among light entering the image capture element 103. That is to say, the infrared cut-off filter 102 attenuates a light amount of infrared rays, among light entering the image capture element 103. The infrared cut-off filter 102 may be contained in the image capture optical system 101, or may be provided closer to the light-entering side than the image capture optical system 101.

The image capture element 103 photoelectrically converts an object image formed by the image capture optical system 101 into an electrical signal. The image capture element 103 is an integrated circuit (IC) chip including a photoelectric-conversion element, such as a charge-coupled device (CCD) element or a complementary metal-oxide-semiconductor (CMOS) element, and on which pixels are arrayed in a matrix. The image capture element 103 has high sensitivities mainly to visible light (wavelengths from 380 to 780 nanometer), and each of the pixels has a high sensitivity to red (R), green (G), or blue (B), but the image capture element 103 also has sensitivities to infrared rays to some extent. For this reason, the image capture element 103 can capture an image of a bright object with infrared rays in a time period when there is sun light, in a place illuminated by an infrared illumination, and the like. An exposure control unit 202 described below sets any exposure time for each of the pixels or each pixel group of the image capture element 103.

The A/D converter 104 converts a light amount of an object detected by the image capture element 103 into a digital signal value.

The image processing unit 105 is an image processing unit that performs image processing on image data of a digital signal output from the A/D converter 104.

The encoder unit 106 is a conversion unit that performs conversion processing for converting image data processed by the image processing unit 105 into a file format, such as Motion Joint Photographic Experts Group (JPEG), Advanced Video Coding (H.264), or High Efficiency Video Coding (H.265).

The network I/F 107 is an interface used for communication with an external device (not illustrated) through a network 114. The network I/F 107 is controlled by the communication control unit 113.

The CPU 108 is a control unit that collectively controls operation of the image capture device 100. The CPU 108 reads commands stored in the ROM 109 or the RAM 110, and, according to the results, executes processing.

The filter driving unit 111 is a galvanometer, a stepping motor, or the like, and drives the infrared cut-off filter 102 according to an instruction from the CPU 108 to switch the infrared cut-off filter 102 between a state in which the infrared cut-off filter 102 is inserted and a state in which the infrared cut-off filter 102 is removed. An image capture mode in which an image is captured with the infrared cut-off filter 102 inserted is referred to as a day mode (first mode). An image capture mode in which an image is captured with the infrared cut-off filter 102 removed is referred to as a night mode (second mode).

The optical-system driving unit 112 drives the image capture optical system 101 according to an instruction from the CPU 108 to execute focus control, shutter control, aperture adjustment, or the like.

The communication control unit 113 performs control to transmit control relating to each of the units of the image capture device 100, to the CPU 108 through communication with an external device (not illustrated), such as a computer, through the network 114. Accordingly, control relating to each of the units of the image capture device 100 may be performed by transmitting a command from an external device to the CPU 108, or may be performed by the CPU 108 reading a command stored in the ROM 109 or the RAM 110.

(Functional Configuration)

Figure 2:
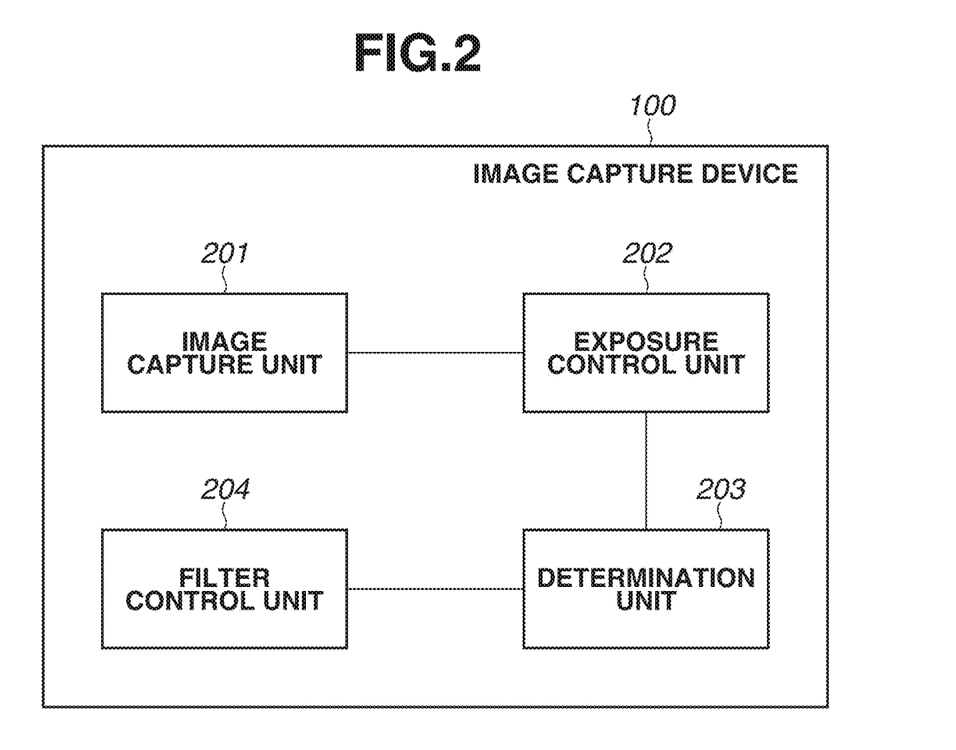
FIG. 2 is a schematic view illustrating a functional configuration of the image capture device according to the first exemplary embodiment.

FIG. 2 is a block diagram illustrating a functional configuration of the image capture device 100 according to the first exemplary embodiment. Among the units illustrated in FIG. 2, an exposure control unit (control unit) 202, a determination unit 203, and a filter control unit 204 are a functional configuration implemented by the CPU 108 reading and executing commands stored in the ROM 109 and the RAM 110. Accordingly, these units correspond to the CPU 108, and the CPU 108 of the image capture device 100 includes the exposure control unit 202, the determination unit 203, and the filter control unit 204.

An image capture unit 201 captures an image by photoelectrically converting light beams focused by the image capture optical system 101 in an exposure time determined for each of pixel groups each including at least one pixel on an image capture surface of the image capture element 103. The image capture unit 201 amplifies an analog signal value of each of the pixel groups that has resulted from the photoelectric conversion, by an analog gain determined for each of the pixel groups.

The A/D converter 104 generates image data by converting the analog signal values into digital signal values.

Each pixel value of the image data output from the A/D converter 104 indicates information about a light amount received by each of the pixels, as brightness information. On the basis of the brightness information, or more specifically on the basis of the brightness information about each of the pixel groups (for example, an average value of brightness), the exposure control unit 202 determines an exposure time of the image capture element 103 and an analog gain for each of the pixel groups.

On the basis of an exposure time of each of the pixel groups determined by the exposure control unit 202, the determination unit 203 determines whether an image capture mode will be the day mode or the night mode (the detail will be described below).

According to the image capture mode determined by the determination unit 203, the filter control unit 204 drives the filter driving unit 111 to control insertion or removal of the infrared cut-off filter 102. More specifically, in a case where the determination unit 203 determines that an image capture mode will be the day mode, the control is performed to insert the infrared cut-off filter 102 into the optical path. Alternatively, in a case where the determination unit 203 determines that an image capture mode will be the night mode, the control is performed to remove the infrared cut-off filter 102 from the optical path.

(Description of Operation)

Control of removal of the infrared cut-off filter 102 according to the present exemplary embodiment will be described with reference to FIGS. 3A to 3C, 4, and 5A and 5B (control of insertion will be described below).

Figures 3A, 3B, 3C:
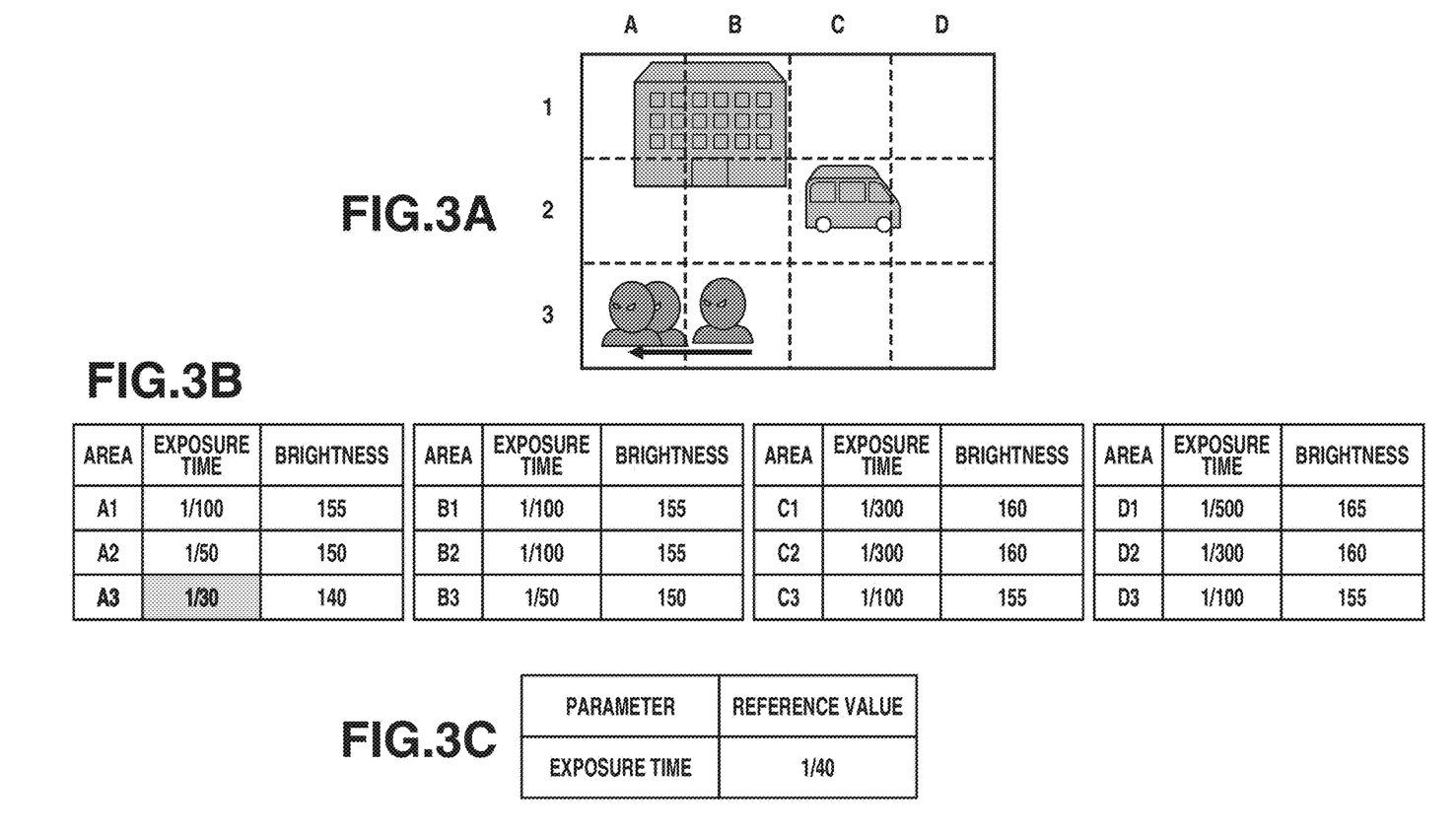
FIGS. 3A to 3C are drawings illustrating an image captured with the image capture device according to the first exemplary embodiment in a day mode, an exposure time and an average value of brightness of each pixel group, and a reference value.

FIG. 3A illustrates an image captured in the day mode by the image capture unit 201. In the present exemplary embodiment, one pixel group includes at least one pixel of the image capture element 103 in image capturing, and pixels of the image capture element 103 in image capturing are grouped into twelve pixel groups. Here, the image capture surface of the image capture element 103 includes 1920☐1080 pixels, and the grouping is performed with 480☐360 pixels as one pixel group. Broken lines represent boundaries of image areas captured by each of the pixel groups. Hereinafter, the image areas respectively corresponding to the pixel groups are denoted by A1 to A3, B1 to B3, C1 to C3, and D1 to D3.

FIG. 3B illustrates an exposure time and an average value of brightness of each of the pixel groups (an example where a gradation of the brightness is 8 bit). As described above, an exposure time of each of the pixel groups is controlled by the exposure control unit 202, on the basis of brightness information about each of the pixel groups (for example, an average value of the brightness). For this reason, brightness differences between the pixel groups in FIG. 3B are smaller than brightness differences between the pixel groups before the control of the exposure times (not illustrated).

On the other hand, an exposure time of A3 is longer than exposure times of other areas (for example, B3) by the exposure control unit 202. Here, suppose a case where there is an object moving from B3 to A3 at a high speed. In this case, since the exposure time becomes longer from B3 to A3, shake that has not occur in B3 may occur in A3. This may be a cause of hindering a function that requires visibility (for example, a function of tracking an object) in a case where an image of a moving object is captured.

FIG. 3C illustrates a reference value of the exposure times. The reference value may be preliminarily set or may be optionally set by a user. Consequently, a reference value appropriate for velocities of various conceivable moving objects can be set. The reference value of the exposure times illustrated in FIG. 3C may be a maximum value of an exposure time that can be set by the image capture element 103.

The above technique is effective in capturing a color image of an object if possible.

Figure 4:
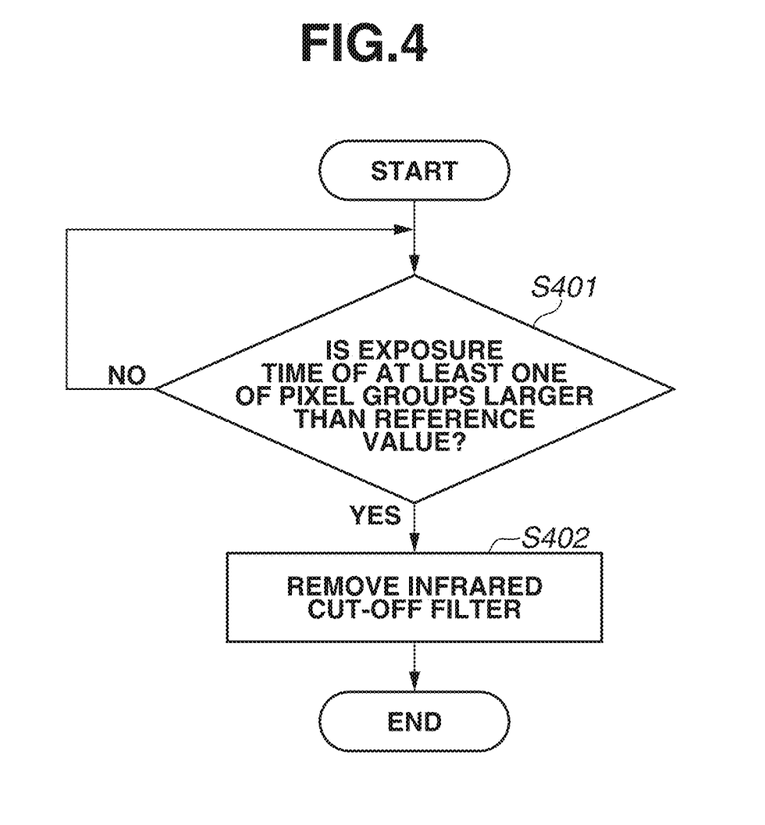
FIG. 4 is a flowchart illustrating operation of the image capture device according to the first exemplary embodiment in the day mode.

FIG. 4 is a flowchart illustrating operation of the image capture device 100 according to the present exemplary embodiment.

In step S401, the determination unit 203 compares a reference value with an exposure time of each pixel group determined by the exposure control unit 202. In a case where, as a result of the comparison, an exposure time of at least one of the pixel groups is larger than the reference value (YES in step S401), the determination unit 203 determines that an image capture mode will be the night mode, and the processing proceeds to step S402. In a case where an exposure time of at least one of the pixel groups is not larger than the reference value (NO in step S401), the processing returns to step S401. Since in FIGS. 3B and 3C, an exposure time of A3 (1/30) is larger than the reference value (1/40), the processing proceeds to step S402.

In step S402, since the determination unit 203 has determined that the image capture mode will be the night mode, the filter control unit 204 causes the filter driving unit 111 to remove the infrared cut-off filter 102 from the optical path to switch the image capture mode to the night mode.

Figures 5A, 5B:
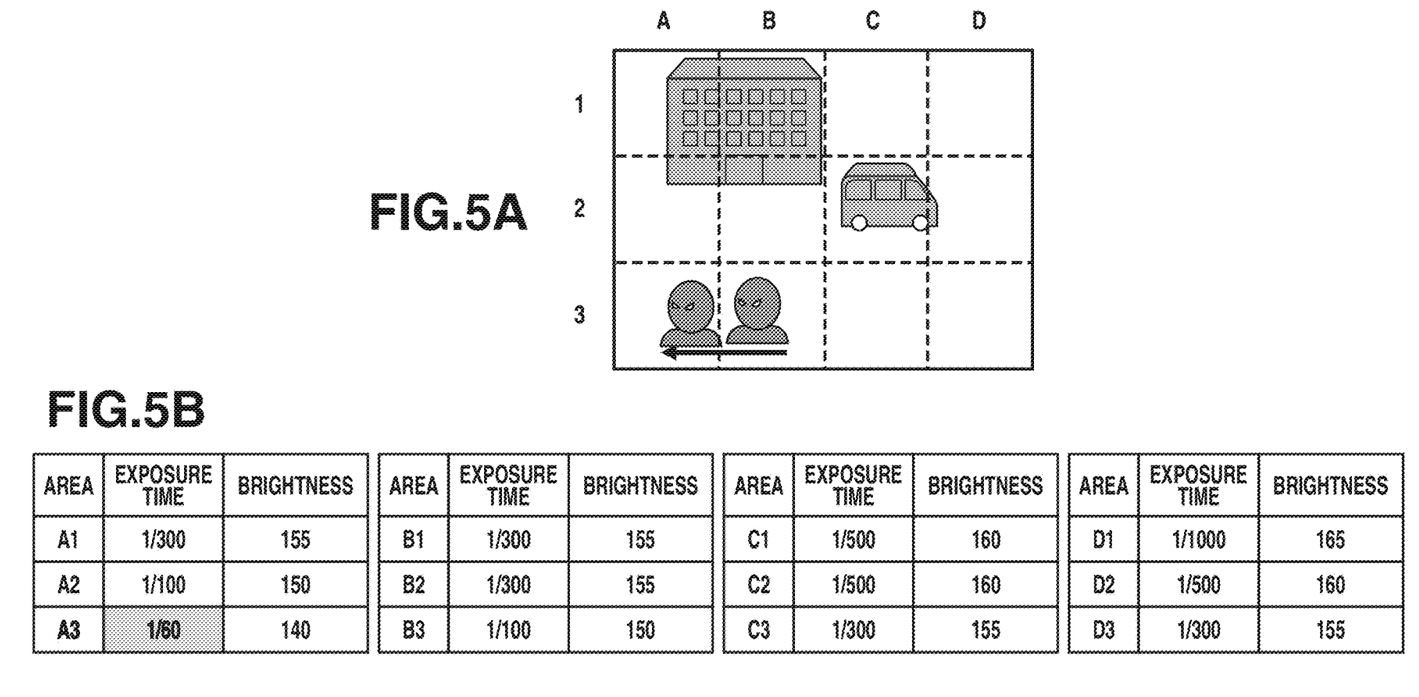
FIGS. 5A and 5B are drawings illustrating an image captured with the image capture device according to the first exemplary embodiment in a night mode, and an exposure time and an average value of brightness of each pixel group.

FIG. 5A illustrates an image captured by the image capture unit 201 after the infrared cut-off filter 102 is removed (an example where a gradation of brightness is 8 bit). FIG. 5B illustrates an exposure time of each of pixel groups and an average value of brightness of an image captured by each of the pixel groups in the image of FIG. 5A. Since the infrared cut-off filter 102 has been removed from the optical path, an amount of light that enters the image capture element 103 increases compared with a case in the day mode. Accordingly, the exposure control unit 202 performs control so that an exposure time of each of the pixel groups is shorter than exposure times in FIG. 3B. As a result, even if there is an object moving from B3 to A3 at a high speed, shake is less likely to occur since an exposure time of A3 shortens. That is to say, since according to the present exemplary embodiment, the day mode is switched to the night mode before occurrence of exposure times of long seconds that cause shake, deterioration of visibility of an object is decreased.

Figures 6A, 6B:
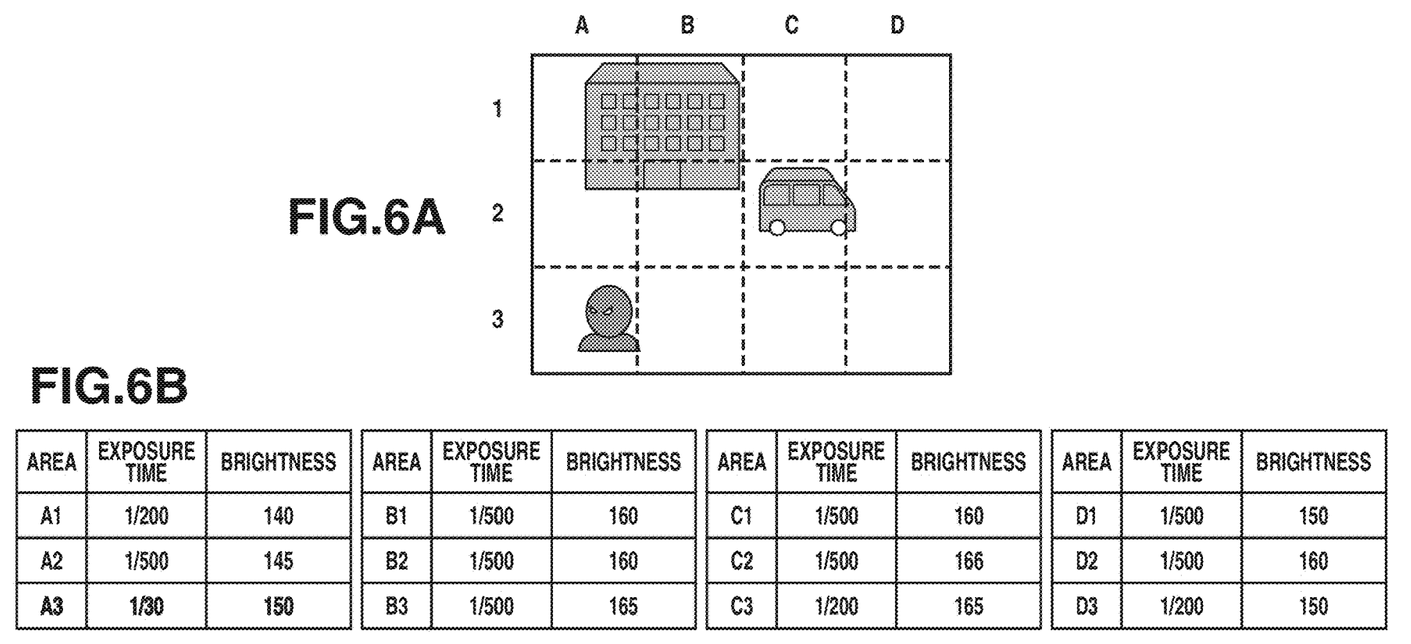
FIGS. 6A, 6B, and 6C are drawings illustrating an image captured with the image capture device according to the first exemplary embodiment after a time passes from a switch to the night mode, exposure times and average values of brightness of pixel groups, and a reference value.
Figure 6C:
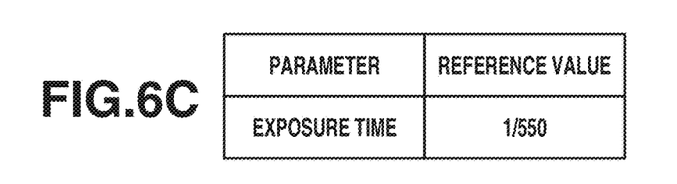

Control of insertion of the infrared cut-off filter 102 will be described with reference to FIGS. 6A to 6C and 7. FIG. 6A is an image captured after a time passes from removal of the infrared cut-off filter 102. FIGS. 6B and 6C illustrate an exposure time and an average value of brightness of each of pixel groups in the image, and a reference value of the exposure times.

Figure 7:
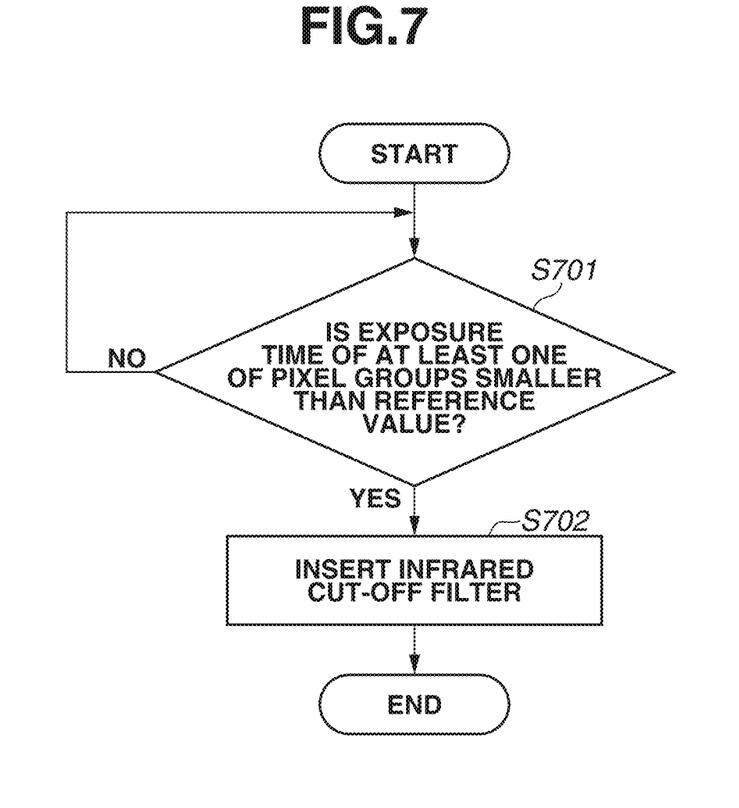
FIG. 7 is a flowchart illustrating operation of the image capture device according to the first exemplary embodiment in the night mode.

FIG. 7 is a flowchart illustrating control of insertion of the infrared cut-off filter 102 according to the present exemplary embodiment.

In step S701, the determination unit 203 compares a reference value with an exposure time of each pixel group. In a case where, as a result of the comparison, an exposure time of at least one of the pixel groups is smaller than the reference value (YES in step S701), the determination unit 203 determines that an image capture mode will be the day mode, and the processing proceeds to step S702. In a case where an exposure time of at least one of the pixel groups is not smaller than the reference value (NO in step S701), the processing returns to step S701. Since in FIGS. 6B and 6C, an exposure time of A3 (1/600) is smaller than the reference value (1/550), the processing proceeds to step S702.

In step S702, since the determination unit 203 has determined that the image capture mode will be the day mode, the filter control unit 204 causes the filter driving unit 111 to insert the infrared cut-off filter 102 into the optical path to switch the image capture mode to the day mode.

In a second exemplary embodiment, control of insertion of an infrared cut-off filter 102 will be described. In a case where a determination unit 203 determines that the infrared cut-off filter 102 will be removed, an image capture device 100 according to the present exemplary embodiment first stores position information about a pixel group that has been compared by the determination unit 203. The present exemplary embodiment is characterized in that on the basis of the stored position information and an exposure time of each pixel group, the determination unit 203 determines whether or not the infrared cut-off filter 102 will be inserted. The device configuration of the image capture device 100 according to the present exemplary embodiment is identical to the device configuration in the first exemplary embodiment described above, and thus the description is omitted.

(Functional Configuration)

Figure 8:
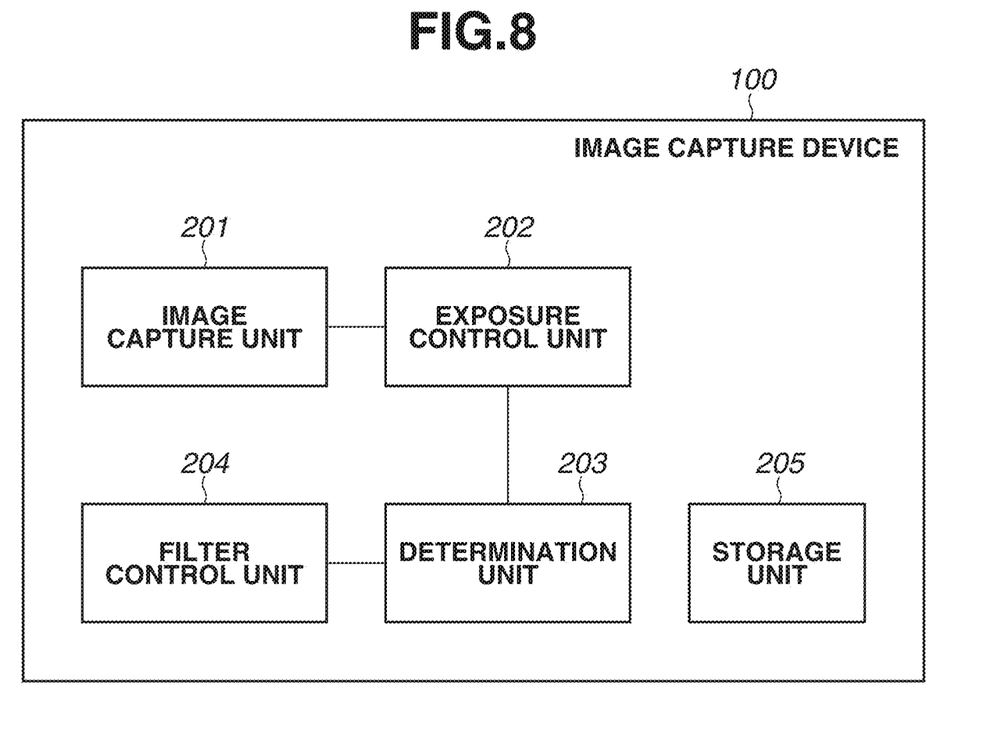
FIG. 8 is a schematic view illustrating a functional configuration of an image capture device according to a second exemplary embodiment.

FIG. 8 is a block diagram illustrating a functional configuration of the image capture device 100 according to the present exemplary embodiment.

In addition to the configuration of the first exemplary embodiment, the image capture device 100 according to the present exemplary embodiment includes a storage unit 205. Each unit except the storage unit 205 is the same as each unit in the first exemplary embodiment described above, and thus the description is omitted.

In a case where the determination unit 203 determines that the infrared cut-off filter 102 will be removed, the storage unit 205 stores position information about the pixel group in a storage medium, such as RAM 110.

(Description of Operation)

Figure 9:
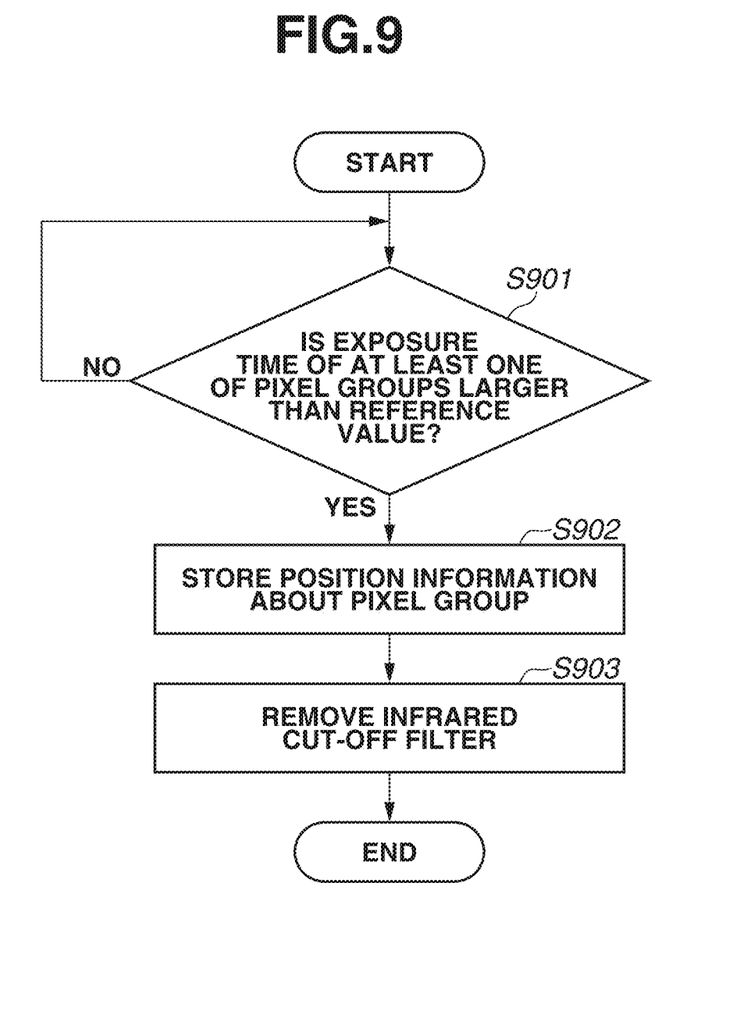
FIG. 9 is a flowchart illustrating operation of the image capture device according to the second exemplary embodiment in the day mode.

FIG. 9 is a flowchart illustrating control of removal of the infrared cut-off filter 102 according to the present exemplary embodiment. Operation in step S901 is the same as operation in step S401, and thus the description is omitted.

In a case where the determination unit 203 has determined that an image capture mode will be the night mode, in step S902, the storage unit 205 stores position information about a pixel group referred to when the determination unit 203 has determined that the image capture mode will be the night mode. Here, suppose that, in the same manner as in the first exemplary embodiment, the determination unit 203 has referred to an exposure time of A3 to determine that the image capture mode will be the night mode. The storage unit 205 temporarily stores position information about a pixel group (A3, here) in a storage medium, such as the RAM 110.

In step S903, in the same manner as in the first exemplary embodiment, the infrared cut-off filter 102 is removed to switch the image capture mode to the night mode. The order of steps S903 and S904 may be reversed.

Control of insertion of the infrared cut-off filter 102 according to the present exemplary embodiment will be described with reference to FIGS. 10A to 10C, 11A to 11C, and 12.

Figure 10A:
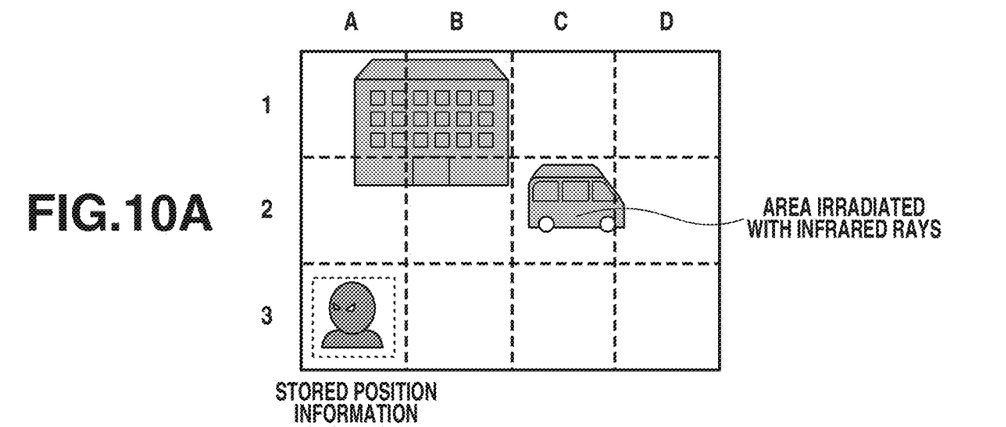
FIGS. 10A, 10B, and 10C are drawings illustrating an image captured with the image capture device according to the second exemplary embodiment immediately after a switch to the night mode, an exposure time and an average value of brightness of each pixel group, and a reference value.
Figure 10B:
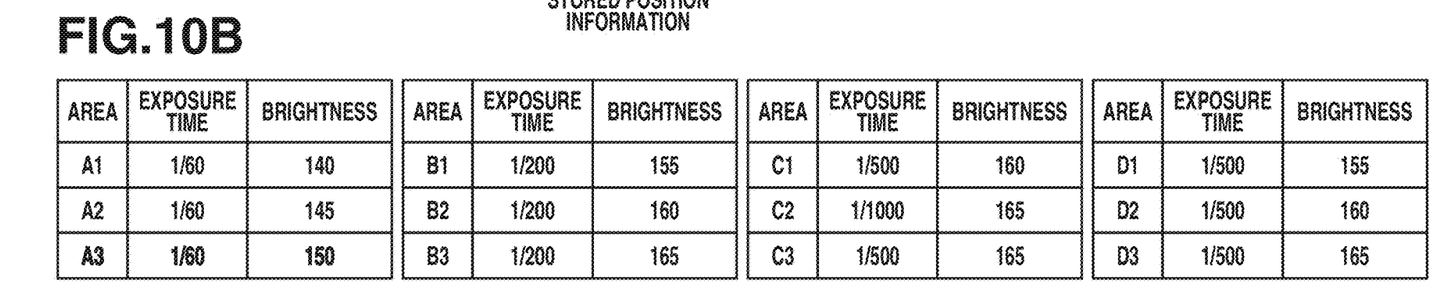
Figure 10C:
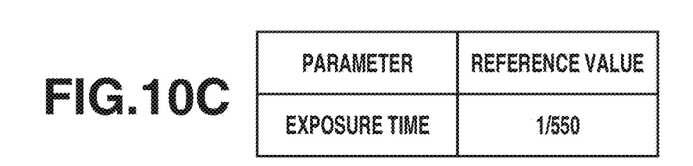

FIG. 10A is an image captured immediately after the image capture mode is switched to the night mode. FIG. 10B illustrates an exposure time and an average value of brightness of each pixel group in the image (a gradation of the brightness is 8 bit). FIG. 10C illustrates a reference value of the exposure times.

Here, C2 is irradiated with an infrared illumination (not illustrated) provided in the image capture device 100 or provided in addition to the image capture device 100.

Figures 11A, 11B, 11C:
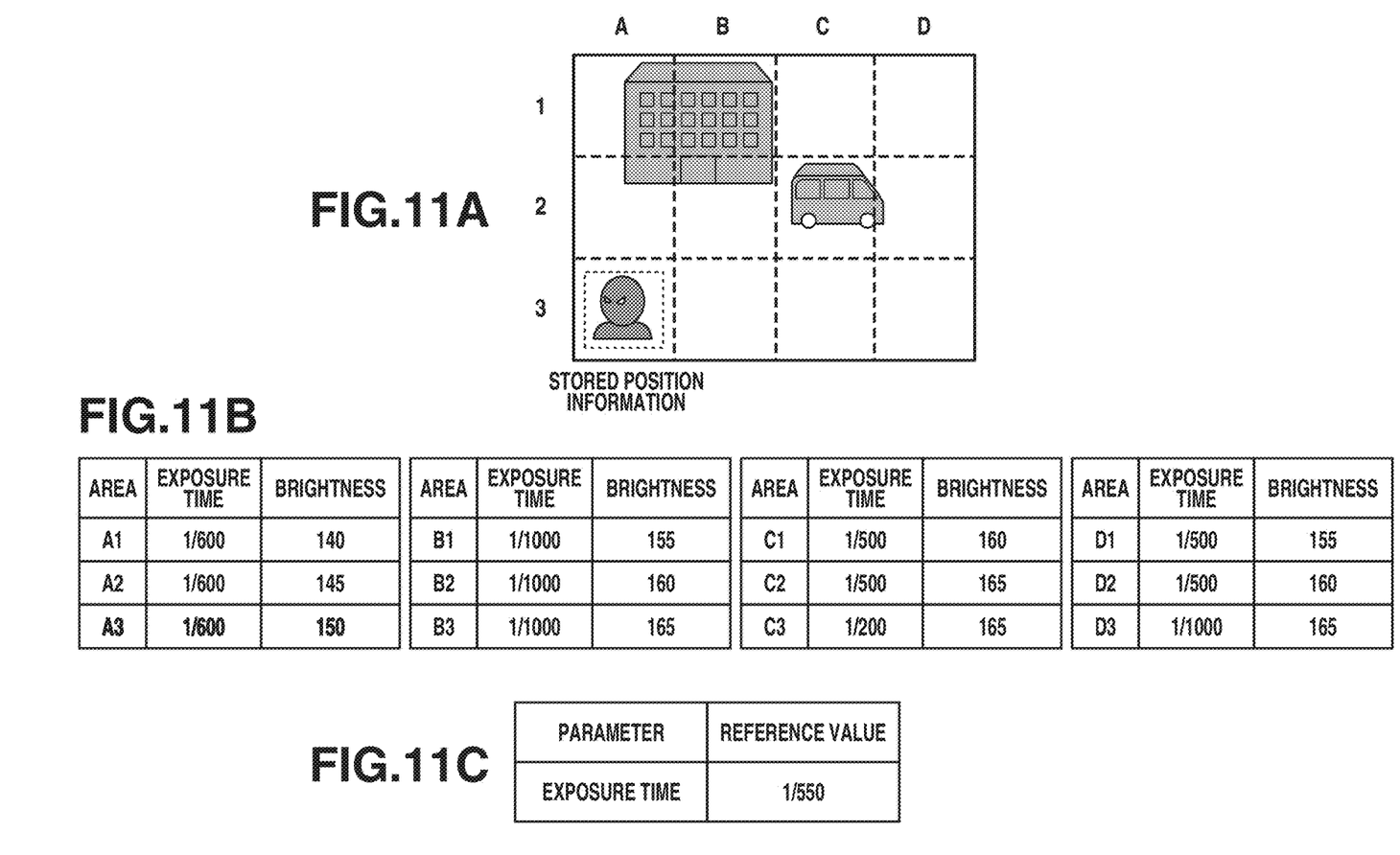
FIGS. 11A, 11B, and 11C are drawings illustrating an image captured with the image capture device according to the second exemplary embodiment after a time passes from a switch to the night mode, an exposure time and an average value of brightness of each pixel group, and a reference value.

FIG. 11A is an image captured when a time passes after the image capture mode is switched to the night mode, and the whole image becomes brighter than that in FIG. 10A. FIG. 11B illustrates an exposure time and an average value of brightness of each pixel group in the image (a gradation of the brightness is 8 bit). FIG. 11C illustrates a reference value of the exposure times.

The reference value of the exposure times is set shorter than a reference value of exposure times in control of removal of the infrared cut-off filter 102. However, if the set reference value is too short, an image capture time in the night mode becomes long, and color information about an object is lost. For this reason, the set reference value is long to the extent that hunting does not occur. Instead of a single value, a difference from an exposure time immediately after the image capture mode is switched to the night mode, or the like may be used. In FIGS. 10C and 11C, reference values of exposure times are set to 1/550 as a single value.

Figure 12:
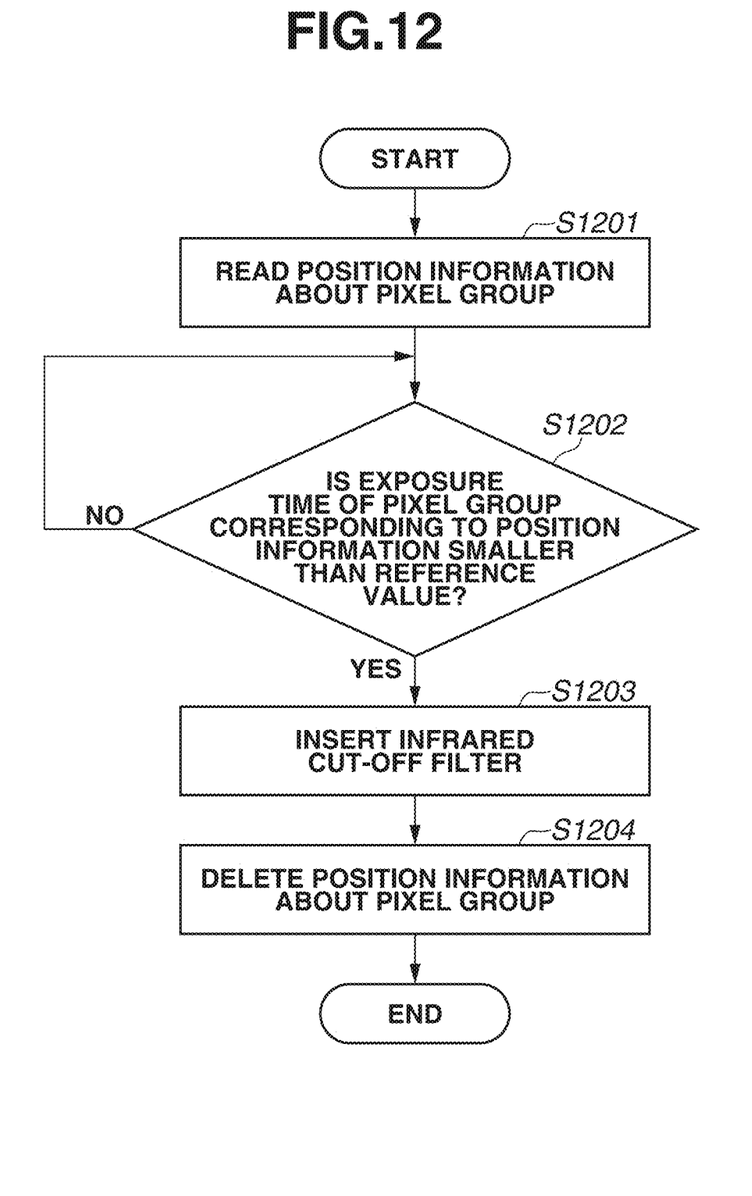
FIG. 12 is a flowchart illustrating operation of the image capture device according to the second exemplary embodiment in the night mode.

FIG. 12 is a flowchart illustrating control of insertion of the infrared cut-off filter 102 in the night mode. First, in step S1201, position information about a pixel group stored in the storage unit 205 is read. That is to say, A3 is read, here.

In step S1202, an exposure time of a pixel group corresponding to the position information read by the determination unit 203 is referred to, and compared with a reference value. In a case where, as a result of the comparison, the exposure time is smaller than the reference value (YES in step S1202), the determination unit 203 determines that an image capture mode will be the day mode, and the processing proceeds to step S1203. In a case where the exposure time is not smaller than the reference value (NO in step S1202), the processing returns to step S1202. Here, an exposure time in A3 is compared with the reference value. In a case of FIGS. 10B and 10C immediately after the image capture mode is switched to the night mode, since an exposure time in A3 is 1/60, which is not smaller than 1/550 as the reference value, (the exposure time is longer than the reference value) (NO in step S1202), the processing returns to step S1202. In a case of FIGS. 11B and 11C, since an exposure time in A3 is 1/600, which is smaller than 1/550 as the reference value, (the exposure time is shorter than the reference value) (YES in step S1202), it is determined that an image capture mode will be the day mode, and the processing proceeds to step S1203.

Here, in a case where the night mode is switched to the day mode without storing position information about a pixel group, an area different from an area referred to when the image capture mode is switched from the day mode to the night mode may be irradiated with an infrared illumination (not illustrated) in the night mode, as described above.

In this case, the following issue occurs.

In FIG. 10B, an exposure time of a pixel group in A3 is not smaller than the reference value (the exposure time is longer than the reference value). On the other hand, an exposure time of a pixel group in C2 is smaller than the reference value (the exposure time is shorter than the reference value). In this case, in the first exemplary embodiment, due to YES in step S701 in FIG. 7, an image capture mode is switched to the day mode even immediately after the image capture mode is switched to the night mode. Consequently, a possibility of occurrence of hunting that immediately after an image capture mode is switched from the day mode to the night mode, the image capture mode is switched again to the day mode is increased.

On the other hand, since in the present exemplary embodiment, position information about a pixel group referred to when the image capture mode is switched to the night mode is stored, a possibility of occurrence of hunting is decreased.

Step S1203 is the same as step S702 in the first exemplary embodiment, and thus the description is omitted.

In step S1204, the position information about a pixel group stored in a storage medium, such as the RAM 110, is deleted.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD))?), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-207883, filed Dec. 15, 2020, which is hereby incorporated by reference herein in its entirety.

What is claimed is:

1. An image capture device comprising:
   an image capture circuit configured to capture an image formed by an image capture optical system;
   a processor; and
   a memory containing instructions that, when executed by the processor, cause the processor to function as:
       a control unit configured to control exposure by determining an exposure time of each of a plurality of pixel groups including one or more pixels on an image capture surface of the image capture circuit,
       a determination unit configured to, on a basis of the exposure time determined by the control unit, determine whether an image capture mode is to be a first mode in which an infrared-attenuating filter configured to attenuate infrared rays is inserted in an optical path of the image capture optical system or a second mode in which the infrared-attenuating filter is removed from the optical path of the image capture optical system, and
       a filter control unit configured to control insertion and removal of the infrared-attenuating filter depending on the image capture mode determined by the determination unit,
   wherein the exposure time of each of the plurality of pixel groups can be different,
   wherein the determination unit is configured to determine that the image capture mode is to be the first mode in a case where the exposure time of at least one of the plurality of pixel groups is smaller than a first reference value, and determine that the image capture mode is to be the second mode in a case where the exposure time of at least one of the plurality of pixel groups is larger than a second reference value.

2. The image capture device according to claim 1, wherein the filter control unit is configured to perform control to insert the infrared-attenuating filter into the optical path in a case where the determination unit determines that the image capture mode is to be the first mode, and perform control to remove the infrared-attenuating filter from the optical path in a case where the determination unit determines that the image capture mode is to be the second mode.

3. The image capture device according to claim 1, wherein the first reference value is smaller than the second reference value.

4. The image capture device according to claim 1, wherein the first reference value and the second reference value are settable by a user.

5. The image capture device according to claim 1, wherein the processor further functions as a storage unit configured to store position information about the pixel group relating to determination of the determination unit in a case where the determination unit determines that the image capture mode is to be the second mode.

6. The image capture device according to claim 5, wherein the determination unit is configured to determine to switch the image capture mode between the first mode and the second mode on a basis of the position information about the pixel group stored by the storage unit and the exposure time.

7. A method of controlling an image capture device configured to switch an image capture mode between a first mode in which an infrared-attenuating filter having a transmittance of visible light larger than a transmittance of infrared rays is inserted in an optical path of an image capture optical system and a second mode in which the infrared-attenuating filter is removed from the optical path of the image capture optical system, and to capture an image formed by the image capture optical system, the method comprising:
   determining an exposure time of each of pixel groups including one or more pixels of an image capture circuit of the image capture device;
   capturing an image formed by the image capture optical system in the exposure time determined for each of the pixel groups;
   determining whether the image capture mode is to be the first mode or the second mode, on a basis of the exposure time determined in the determining of the exposure time; and
   controlling insertion and removal of the infrared-attenuating filter depending on the image capture mode determined in the determining of the image capture mode,
   wherein the exposure time of each of the plurality of pixel groups can be different,
   wherein determining whether the image capture mode is to be the first mode or the second mode comprises determining that the image capture mode is to be the first mode in a case where the exposure time of at least one of the plurality of pixel groups is smaller than a first reference value, and determining that the image capture mode is to be the second mode in a case where the exposure time of at least one of the plurality of pixel groups is larger than a second reference value.

8. The method of controlling the image capture device according to claim 7, wherein, in the controlling, control is performed to insert the infrared-attenuating filter into the optical path in a case where, in the determining of the image capture mode, it is determined that the image capture mode is to be the first mode, and control is performed to remove the infrared-attenuating filter from the optical path in a case where, in the determining of the image capture mode, it is determined that the image capture mode is to be the second mode.

9. The method of controlling the image capture device according to claim 7, wherein, in the determining of the image capture mode, it is determined that the image capture mode is to be the first mode in a case where the exposure time of at least one of the plurality of pixel groups is smaller than a first reference value, and it is determined that the image capture mode is to be the second mode in a case where the exposure time of at least one of the plurality of pixel groups is larger than a second reference value.

10. The method of controlling the image capture device according to claim 9, wherein the first reference value is smaller than the second reference value.

11. The method of controlling the image capture device according to claim 9, wherein the first reference value and the second reference value are settable by a user.

12. The method of controlling the image capture device according to claim 7, further comprising storing position information about the pixel group relating to determination in the determining of the image capture mode in a case where it is determined that the infrared-attenuating filter is to be removed, in the determining of the image capture mode.

13. The method of controlling the image capture device according to claim 12, wherein, in the determining of the image capture mode, it is determined to switch the image capture mode between the first mode and the second mode on a basis of the position information about the pixel group stored in the storing and the exposure time.

14. A non-transitory computer-readable storage medium that stores a program for causing a computer to execute the method of controlling the image capture device according to claim 7.

* * * * *